(12) United States Patent
Ouchi

(10) Patent No.: US 9,191,638 B2
(45) Date of Patent: Nov. 17, 2015

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Akihiro Ouchi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 120 days.

(21) Appl. No.: 14/173,925

(22) Filed: Feb. 6, 2014

(65) Prior Publication Data

US 2014/0225909 A1 Aug. 14, 2014

(30) Foreign Application Priority Data

Feb. 12, 2013 (JP) ................................. 2013-024913

(51) Int. Cl.
*H04N 9/31* (2006.01)
(52) U.S. Cl.
CPC ........... *H04N 9/3182* (2013.01); *H04N 9/3147* (2013.01)
(58) Field of Classification Search
CPC ....................................................... G09G 5/10
See application file for complete search history.

(56) References Cited

U.S. PATENT DOCUMENTS

2004/0227908 A1* 11/2004 Wada et al. ...................... 353/94
2005/0206857 A1* 9/2005 Yamada ........................... 353/94

FOREIGN PATENT DOCUMENTS

JP 2005-117266 A 4/2005
JP 2007-295026 A 11/2007

* cited by examiner

*Primary Examiner* — Kee M Tung
*Assistant Examiner* — Grace Q Li
(74) *Attorney, Agent, or Firm* — Carter, DeLuca, Farrell & Schmidt, LLP

(57) ABSTRACT

An image processing apparatus corrects a luminance level of an overlap region of projection screens projected by a plurality of image display apparatuses. The image processing apparatus includes: a coordinate conversion unit configured to convert a coordinate value of the overlap region into a coordinate value of an overlap region of not less than a maximum overlap region width; an interpolation calculation unit configured to select two luminance correction data using the converted coordinate value, and to calculate a luminance correction coefficient by interpolating the luminance correction data using the selected luminance correction data and the converted coordinate value; and a correction unit configured to correct the luminance level of the overlap region using the luminance correction coefficient.

9 Claims, 3 Drawing Sheets

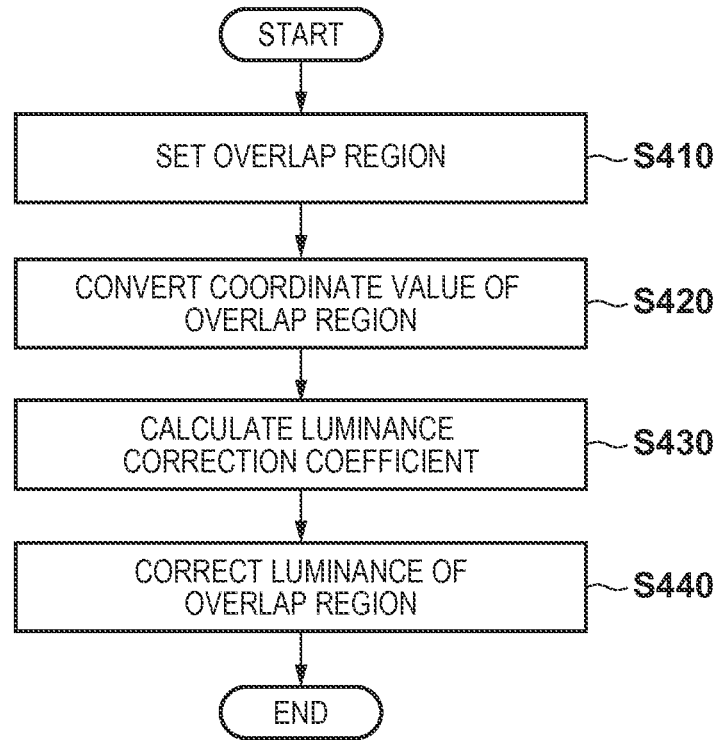
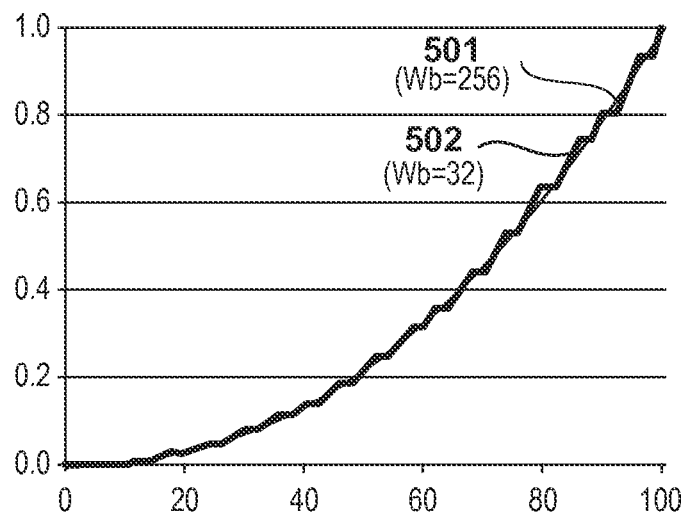

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, an image processing method, and a storage medium and, more particularly, to an image processing technique for correcting a luminance of an overlap region of projection screens projected by a plurality of image display apparatuses.

2. Description of the Related Art

Conventionally, when a multi-screen display is configured using a plurality of projection type image display apparatuses, an overlapping image region (image overlap region) is assured between neighboring projection type image display apparatuses, and an image signal of the image overlap region undergoes luminance correction, thus obscuring a seam. By setting the image overlap region to have a predetermined width, even when the projection type image display apparatuses have slightly different characteristics of luminance levels, colors, and the like, such differences are not easily visually recognized.

As a luminance correction method, a method using electrical signal processing (electrical luminance correction) is available. When a luminance level is to be lowered linearly toward an image end portion in an overlap image region, in consideration of a display gamma ($\gamma$), an output image signal Vo is calculated by:

$$Vo = ((x/W)^\gamma) * Vi \quad (1)$$

where Vi is an input image signal, W is an image overlap region width, and x is a distance from an image end of the image overlap region. When the image overlap region width is variable, since the circuit implementation of this calculation requires a large circuit scale, a method also using an LUT is generally used (Japanese Patent Laid-Open Nos. 2005-117266 and 2007-295026).

A technique disclosed in Japanese Patent Laid-Open No. 2005-117266 reduces a circuit scale by implementing (1/W) in equation (1) by multiplication of a coefficient read out from the LUT and a right bit shift operation. However, the number of coefficients stored in the LUT has to be equal to a maximum W of the variable widths. Also, a luminance correction LUT corresponding to the display gamma ($\gamma$) is additionally required, and a circuit scale reduction effect is consequently low.

On the other hand, in a technique disclosed in Japanese Patent Laid-Open No. 2007-295026, letting Wb be a reference image overlap region width, for example, a luminance correction coefficient Tb(x) which considers the display gamma ($\gamma$) is stored in a reference LUT. The luminance correction coefficient Tb(x) is given by:

$$Tb(x) = (x/Wb)^\gamma \quad (x=0, 1, \ldots, Wb) \quad (2)$$

Then, when the image overlap region width is set to be Ws, an LUT value as a luminance correction coefficient Ts(x) is referred to, as given by:

$$Ts(x) = Tb(x*Wb/Ws) \quad (x=0, 1, \ldots, Ws) \quad (3)$$

When the image overlap region widths satisfy Ws≤Wb, a position in the image overlap region width Ws is associated with that in the reference image overlap region width Wb to have one-to-one correspondence. However, when Ws>Wb, since a position in the image overlap region width Ws cannot be associated with that in the reference image overlap region width Wb to have one-to-one correspondence, an appropriate luminance correction coefficient cannot be obtained in the overlap region, and the overlap region is recognized as a level difference. FIG. 5 shows an example of a distribution of luminance correction coefficients Ts in the related art. The ordinate plots values of luminance correction coefficients Ts, and the abscissa plots the overlap region widths. FIG. 5 shows a luminance correction coefficients Ts (501) when Wb=256 with respect to Ws=100, and a luminance correction coefficients Ts (502) when Wb=32. By setting Wb to match a maximum value of the variable image overlap region width, Ws≤Wb can always be satisfied. However, the number of coefficients to be stored in the LUT increases in correspondence with the magnitude of Wb.

SUMMARY OF THE INVENTION

The present invention provides an image processing technique which can set an arbitrary overlap region width without lowering the luminance correction precision in an image overlap region with a neighboring projection type image display apparatus in a multi-screen display configured by a plurality of projection. type image display apparatuses.

According to one aspect of the present invention, there is provided an image processing apparatus for correcting a luminance level of an overlap region of projection screens projected by a plurality of image display apparatuses, comprising: a setting unit configured to set an overlap region of the projection screen; a storage unit configured to store luminance correction data required to correct a luminance level of the overlap region; a coordinate conversion unit configured to convert a coordinate value of the overlap region into a coordinate value of an overlap region of riot less than a maximum overlap region width, which is configured to be set by the setting unit; an interpolation calculation unit configured to select two luminance correction data using the converted coordinate value from the storage unit, and to calculate a luminance correction coefficient by interpolating the luminance correction data using the selected luminance correction data and the converted coordinate value; and a correction unit configured to correct the luminance level of the overlap region using the luminance correction coefficient.

According to the present invention, an arbitrary overlap region width can be set without lowering the luminance correction precision in an image overlap region with a neighboring projection type image display apparatus in a multi-screen display configured by a plurality of projection type image display apparatuses.

Further features of the present invention will become apparent from the following description of exemplary embodiments (with reference to the attached drawings).

BRIEF DESCRIPTION OF THE DRAWINGS

FIG. 4 is a flowchart for explaining an image processing method for correcting a luminance level of an overlap region; and FIG. 5 is a graph showing a distribution of luminance correction coefficients in the related art.

DESCRIPTION OF THE EMBODIMENTS

Figure 1:
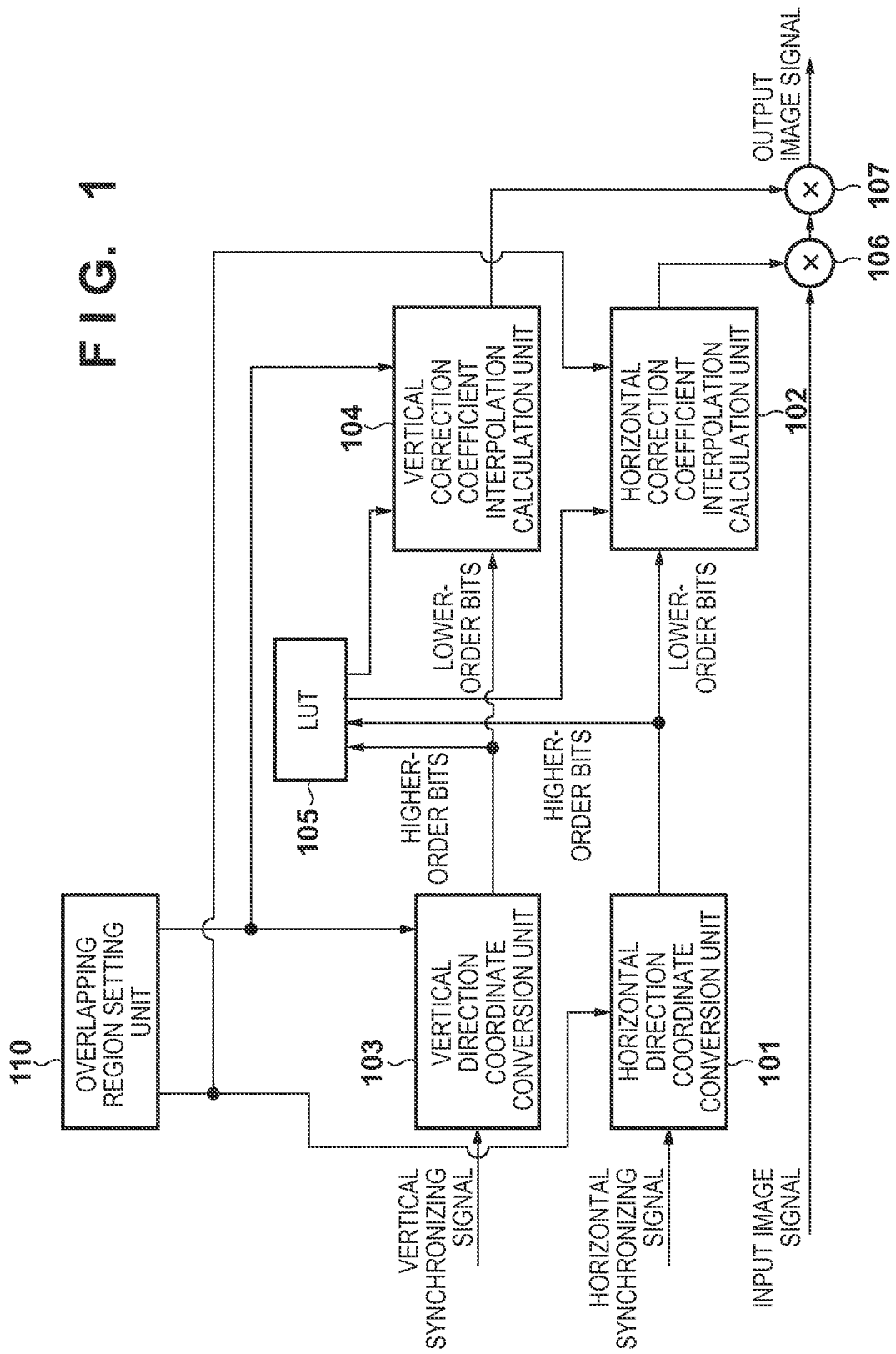
FIG. 1 is a schematic block diagram of an image processing apparatus according to an embodiment of the present invention.
Figure 2:
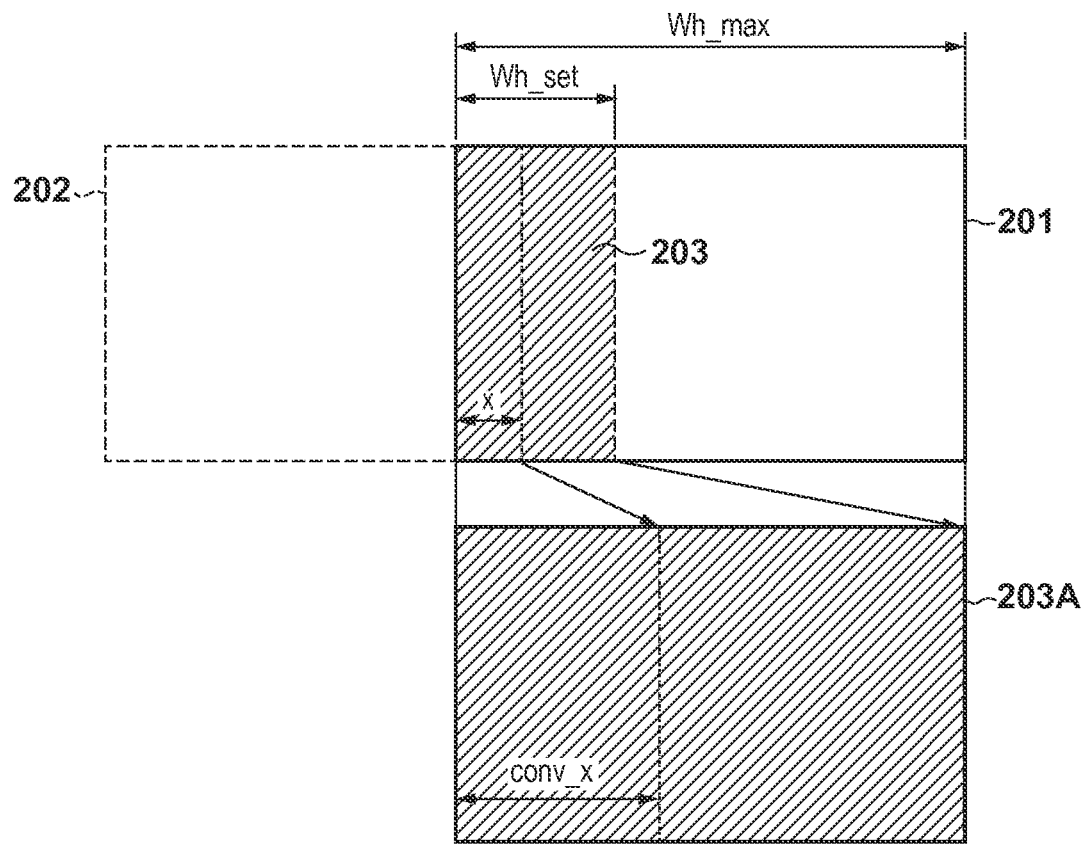
FIG. 2 is a view showing a configuration example of a multi-screen display.

Embodiments of the present invention will be described hereinafter with reference to the drawings. FIG. 1 is a schematic block diagram showing an example of an image processing apparatus according to an embodiment of the present invention. Referring to FIG. 1, a horizontal direction coordinate conversion unit 101 converts a pixel coordinate value in an overlap region in a horizontal direction set by an overlap region setting unit 110 into a coordinate value of a region of a maximum overlap region width or more in the horizontal direction, which can be set by the overlap region setting unit 110. The horizontal direction coordinate conversion unit 101 converts a pixel coordinate value (x) from a screen end in the overlap region in the horizontal direction set by the overlap region setting unit 110 into a coordinate value, which is calculated by:

$$\mathrm{conv}\_x = W\_\mathrm{max}/Wh\_\mathrm{set}*x \quad (4)$$

where Wh_set is a set overlap region width in the horizontal direction, which can be set by the overlap region setting unit 110 (FIG. 2). W_max is a width (coordinate value) of an arbitrary region of the maximum overlap region width or more in the horizontal direction, which can be set by the overlap region setting unit 110 (FIG. 2), and x is a pixel coordinate value (that in the set overlap region) in the horizontal direction from the screen end. Note that x indicates a distance from the screen left end in a left overlap region of a right projection screen 201 shown in FIG. 2. Also, x indicates a distance from the screen right end in a right overlap region of the screen.

FIG. 2 is a view showing a configuration example of a multi-screen display configured by juxtaposing two projection screens in the horizontal direction. In FIG. 2, an overlapping region between the right projection screen 201 and a left projection screen 202 is indicated as an overlap region 203. Wh_set in equation (4) is indicated as a width in the horizontal direction of the overlap region 203. A converted overlap region 203A is a region obtained by converting the overlap region 203 using equation (4). x in the overlap region 203 corresponds to conv_x of the converted overlap region 203A. FIG. 2 exemplarily explains the overlap region in the horizontal direction, and the same applies to an overlap region in the vertical direction. Also, FIG. 2 shows a case in which W_max is equal to the maximum overlap region width in the horizontal direction.

Referring back to FIG. 1, an LUT 105 is a table which stores luminance correction data required to correct a luminance level of the overlap region. For example, letting N be the number of stored data, and γ be gamma characteristics of an image projection apparatus, the LUT 105 stores luminance correction data given by:

When $i/(N-1)<0.5$ $$D(i)=(((i/(N-1)*2)^P)/2)^\gamma$$

When $0.5 \le i/(N-1)$ $$D(i)=(1-(((1-i/(N-1))*2)^P)/2)^\gamma$$

$$(i=0, 1, \ldots, N-1) \quad (5)$$

Note that the luminance correction data given by equations (5) define a so-called "S-shaped" curve which has small inclinations at two ends of the overlap region 203, and includes a line at the center of the overlap region 203, and P in equations (5) is a parameter used to control a curvature of the luminance correction data.

Figure 3:
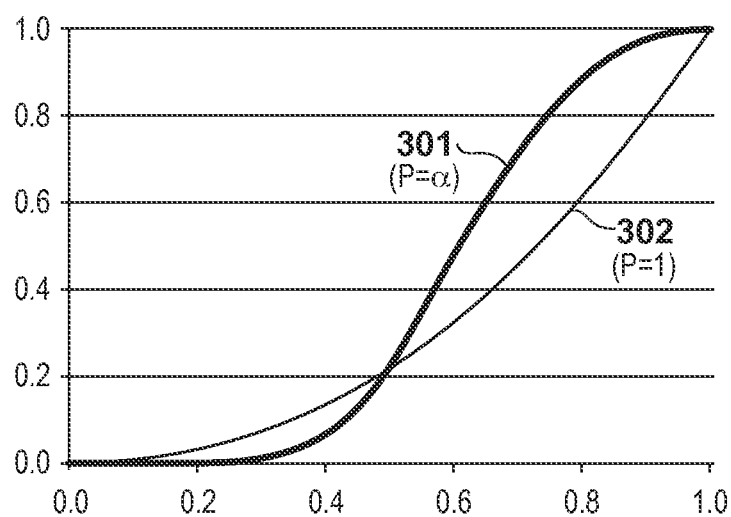
FIG. 3 is a graph exemplifying luminance correction data.

FIG. 3 exemplifies the luminance correction data. The ordinate plots values of the luminance correction data calculated by equations (5), and the abscissa plots values obtained by normalizing i by N−1. An example of luminance correction data which defines the "S-shaped" curve is indicated by a curve 301 in FIG. 3 (P=α).

When the parameter P (used to control a curvature)=1 (a curve 302 in FIG. 3), luminance correction data D(i) which satisfies $i/(N-1)<0.5$ is given by $D(i)=(i/(N-1))^\gamma$. Luminance correction data D(i) which satisfies $0.5 \le i/(N-1)$ is given by $D(i)=(1-(((1-i/(N-1))*2))/2)^\gamma=(i/(N-1))^\gamma$, and these data are the γ-th power of a line formula (i/(N−1)) (i=0, 1, . . . , N−1).

A horizontal correction coefficient interpolation calculation unit 102 selects two table values Dh0 and Dh1 from the LUT 105 according to a coordinate value conv_x converted by the horizontal direction coordinate conversion unit 101. The two table values Dh0 and Dh1 are calculated by:

$$Dh0=D(Sh)$$

$$Dh1=D(Sh+1) \quad (6)$$

$$\text{for } Sh=\mathrm{int}(\mathrm{conv}\_x/W\_\mathrm{max}*(N-1)) \quad (6)$$

Next, the horizontal correction coefficient interpolation calculation unit 102 calculates a luminance correction coefficient Dh in the horizontal direction by an interpolation calculation using the selected two table values Dh0 and Dh1 and the coordinate value conv_x converted by the horizontal direction coordinate conversion unit 101. This interpolation calculation is described by:

$$Dh=Dh0+(Dh1-Dh0)/D\mathrm{dis}*\mathrm{eff}\_x$$

$$\text{for } D\mathrm{dis}=W\_\mathrm{max}/(N-1)$$

$$\mathrm{eff}\_x=\mathrm{conv}\_x-Sh*D\mathrm{dis} \quad (7)$$

A vertical direction coordinate conversion unit 103 converts a pixel coordinate value in an overlap region in the vertical direction set by the overlap region setting unit 110 into a coordinate value of a region of a maximum overlap region width or more in the vertical direction, which can be set by the overlap region setting unit 110. The vertical direction coordinate conversion unit 103 converts a pixel coordinate value (y) from a screen end in the overlap region in the vertical, direction set by the overlap region setting unit 110 into a coordinate value, which is calculated by:

$$\mathrm{conv}\_y=W\_\mathrm{max}/Wv\_\mathrm{set}*y \quad (8)$$

where Wv_set is a set overlap region width in the vertical direction, which can be set by the overlap region setting unit 110. W_max is a width (coordinate value) of an arbitrary region of the maximum overlap region width or more in the vertical direction, which can be set by the overlap region setting unit 110, and y is a pixel coordinate value (that in the set overlap region) in the vertical direction from the screen end. Note that y indicates a distance from the screen upper end in an overlap region on the screen upper side. Also, y indicates a distance from the screen lower end in an overlap region on the screen lower side.

A vertical correction coefficient interpolation calculation unit 104 selects two table values Dv0 and Dv1 from the LUT 105 according to a coordinate value conv_y converted by the vertical direction coordinate conversion unit 103. The two table values Dv0 and Dv1 are calculated by:

$$Dv0=D(Sv)$$

$$Dv1=D(Sv+1)$$

$$\text{for } Sv=\mathrm{int}(\mathrm{conv}\_y/W\_\mathrm{max}*(N-1)) \quad (9)$$

Next, the vertical correction coefficient interpolation calculation unit 104 calculates a luminance correction coefficient Dv in the vertical direction by an interpolation calculation using the selected two table values Dv0 and Dv1, and the coordinate value convy converted by the vertical direction coordinate conversion unit 103. This interpolation calculation is described by:

$$Dv = Dv0 + (Dv1 - Dv0)/D\text{dis} * \text{eff}\_y$$

for $D\text{dis} = W\_\text{max}/(N-1)$ $$\text{eff}\_y = \text{conv}\_y - Sv\_D\text{dis} \quad (10)$$

A multiplying unit 106 (first multiplying unit) multiplies an input image (input image signal) by the luminance correction coefficient Dh in the horizontal direction calculated by the horizontal correction coefficient interpolation calculation unit 102 (luminance correction in the horizontal direction). A multiplying unit 107 (second multiplying unit) multiplies a product output from the multiplying unit 106 by the luminance correction coefficient Dv in the vertical direction calculated by the vertical correction coefficient interpolation calculation unit 104 (luminance correction in the vertical direction).

Note that this embodiment adopts the arrangement which executes luminance correction in the horizontal direction, and then executes that in the vertical direction. However, the correction order may be reversed.

W_max has been described as an arbitrary value so far. More specifically, in the horizontal direction, assume that W_max is a value which is not less than the maximum overlap region width in the horizontal direction, which can be set by the overlap region setting unit 110, and is the power of 2. in the vertical direction, assume that W_max is a value which is not less than the maximum overlap region width in the vertical direction, which can be set by the overlap region setting unit 110, and is the power of 2. Also, assume that as the number N of stored data of the LUT 105, (N−1) is a value which is the power of 2. For example, W_max=2^m, (N−1)=2^n (N=2/^n+1), and m>n (m and n: natural numbers). In this case, Sh in equations (6) and Sv in equations (9) are respectively given by:

$$Sh = \text{int}(\text{conv}\_x/(2^{(m-n)})) \quad (11)$$

$$Sv = \text{int}(\text{conv}\_y/(2^{(m-n)})) \quad (12)$$

Assuming that conv_x calculated by equation (4) and conv_y calculated by equation (8) are expressed by m bits, Sh is equal to a value of n higher-order bits of conv_x, and Sv is equal to a value of n higher-order bits of conv_y. That is, the horizontal correction coefficient interpolation calculation unit 102 can select the table values of the LUT 105 using the n higher-order bits of conv_x. Also, the vertical correction coefficient interpolation calculation unit 104 can select the table values of the LUT 105 using the n higher-order bits of conv_y.

Also, eff_x in equation (7) is equal to a value of (m−n) lower-order bits of conv_x, and eff_y in equation (10) is equal to a value of (m−n) lower-order bits of conv_y. That is, interpolation. coefficient calculations can be made using the (m−n) lower-order bits of conv_x and conv_y. Furthermore, Ddis in equations (7) and (10) is 2^(m−n), and a calculation of 1/Ddis can be attained by a shift calculation. Note that in this embodiment, the LUT 105 is configured as a table. However, the present invention is not limited to this example, and the LUT 105 may be configured as a register. In this embodiment, an arbitrary region width of the maximum overlap region width or more in both the horizontal and vertical directions has been described as W_max. However, these widths need not always be the same.

FIG. 4 is a flowchart for explaining the sequence of processing of an image processing method of the image processing apparatus which corrects a luminance level of an overlap region of projection screens.

In step S410, the overlap region setting unit 110 sets an overlap region of projection screens. In step S420, a coordinate conversion unit (horizontal direction coordinate conversion unit 101 and vertical direction coordinate conversion unit 103) converts a coordinate value of the overlap region into a coordinate value of an overlap region of the maximum overlap region width or more, which can be set in the setting process of step S410.

In step S430, an interpolation calculation unit selects two data from a luminance correction data storage unit according to the converted coordinate value, and calculates a luminance correction coefficient using the selected luminance correction data and the converted coordinate value. Note that the horizontal correction coefficient interpolation calculation unit 102 and vertical correction coefficient interpolation calculation unit 104 function as the interpolation calculation unit in step S430. In step S440, a correction unit (multiplying units 106 and 107) corrects a luminance level of the overlap region using the selected luminance correction data and luminance correction coefficient.

According so this embodiment, an arbitrary overlap region width can be set without lowering the luminance, correction precision in an image overlap region with a neighboring projection type image display apparatus in a multi-screen display configured by a plurality of projection type image display apparatuses.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-024913, filed Feb. 12, 2013, which is hereby incorporated by reference herein in its entirety.

What is claimed is:

1. An image processing apparatus for correcting a luminance level of an overlap region of a projection screen projected by a plurality of image display apparatuses, comprising:
   a setting unit configured to set an overlap region of the projection screen;
   a storage unit configured to store luminance correction data required to correct a luminance level of the overlap region;
   a coordinate conversion unit configured to convert a coordinate value of the overlap region into a coordinate value of an overlap region of not less than a maximum overlap region width, which is configured to be set by the setting unit;
   an interpolation calculation unit configured to select two luminance correction data using the converted coordinate value from the storage unit, and to calculate a luminance correction coefficient by interpolating the selected luminance correction data using the converted coordinate value; and
   a correction unit configured to correct the luminance level of the overlap region using the luminance correction coefficient.

2. The apparatus according to claim 1, wherein the storage unit stores N ($N=2^n+1$ (n: a natural number)) luminance correction data, and
   wherein the coordinate conversion unit converts she coordinate, value of the overlap region into a coordinate value of m bits (m: a natural number, m>n), which is not less than the maximum overlap region width.

3. The apparatus according so claim 2, wherein the interpolation calculation unit selects the luminance correction data from the storage unit using n higher-order bits of the m bits of the coordinate value converted by the coordinate conversion unit.

4. The apparatus according to claim 2, wherein the interpolation calculation unit calculates the luminance correction coefficient using (m−n) lower-order bits of the m bits of the coordinate value converted by the coordinate conversion unit.

5. An image processing method of an image processing apparatus for correcting a luminance level of an overlap region of a projection screen projected by a plurality of image display apparatuses, comprising:
   setting an overlap region of the projection screen;
   converting a coordinate value of the overlap region into a coordinate value of an overlap region of not less than a maximum overlap region width, which is configured to be set in the setting step;
   selecting two luminance correction data using the converted coordinate value from a storage unit; and
   calculating a luminance correction coefficient by interpolating the selected luminance correction data using the converted coordinate value; and
   correcting the luminance level of the overlap region using the luminance correction coefficient.

6. The method according to claim 5, wherein the storage unit stores N ($N=2^n+1$ (n a natural number)) luminance correction data, and
   wherein in the converting step, the coordinate value of the overlap region is converted into a coordinate value of m bits (m: a natural number, m>n), which is not less than the maximum overlap region width.

7. The method according to claim 6, wherein in the calculating step, the luminance correction data are selected from the storage unit using n higher-order bits of the m bits of the coordinate value converted in the converting step.

8. The method according to claim 6, wherein in the calculating step, the luminance correction coefficient is calculated using (m−n) lower-order bits of the m bits of the coordinate value converted in the converting step.

9. A non-transitory computer-readable storage medium storing a program for controlling a computer to function as respective units of an image processing apparatus, the units comprising:
   a setting unit configured to set an overlap region of a projection screen;
   a storage unit configured to store luminance correction data required to correct a luminance level of the overlap region;
   a coordinate conversion unit configured to convert a coordinate value of the overlap region into a coordinate value of an overlap region of not less than a maximum overlap region width, which is configured to be set by the setting unit;
   an interpolation calculation unit configured to select two luminance correction data using the converted coordinate value from the storage unit, and to calculate a luminance correction coefficient by interpolating the selected luminance correction data using the converted coordinate value; and
   a correction unit configured to correct the luminance level of the overlap region using the luminance correction coefficient.

* * * * *